(12) United States Patent
Weber

(10) Patent No.: US 10,920,838 B2
(45) Date of Patent: Feb. 16, 2021

(54) BRAKE DEVICE AND METHOD FOR OPERATING A BRAKE DRUM

(71) Applicant: SAF-HOLLAND GmbH, Bessenbach (DE)

(72) Inventor: Karsten Weber, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 27 days.

(21) Appl. No.: 16/333,831

(22) PCT Filed: Sep. 14, 2017

(86) PCT No.: PCT/EP2017/073156
§ 371 (c)(1),
(2) Date: Mar. 15, 2019

(87) PCT Pub. No.: WO2018/050755
PCT Pub. Date: Mar. 22, 2018

(65) Prior Publication Data
US 2020/0182317 A1 Jun. 11, 2020

(30) Foreign Application Priority Data

Sep. 16, 2016 (DE) ..................... 10 2016 117 461.0

(51) Int. Cl.
*F16D 65/08* (2006.01)
*F16D 65/097* (2006.01)
(Continued)

(52) U.S. Cl.
CPC .......... *F16D 65/097* (2013.01); *B60T 17/088* (2013.01); *F16D 65/08* (2013.01); *F16D 65/14* (2013.01)

(58) Field of Classification Search
CPC ........ F16D 65/097; F16D 65/08; F16D 65/14; F16D 51/16; F16D 65/09
(Continued)

(56) References Cited

U.S. PATENT DOCUMENTS 1,669,965 A    5/1928  Bastien
1,806,297 A    5/1931  Kohr
(Continued)

FOREIGN PATENT DOCUMENTS

DE    434900    10/1926
DE    1059725    6/1959
(Continued)

OTHER PUBLICATIONS

European Patent Office; International Search Report; dated Nov. 15, 2017.

*Primary Examiner* — Thomas W Irvin
(74) *Attorney, Agent, or Firm* — Price Heneveld LLP

(57) ABSTRACT

A brake device for braking a wheel includes a brake drum, a brake pad carrier which is arranged or can be arranged in the brake drum and has at least one brake pad, and an actuator apparatus for the reversible transfer of the brake pad carrier between a braking state, in which the brake pad is operatively connected to the brake drum, and a freewheeling state, in which the operative connection between the brake pad and the brake drum is canceled, the brake pad carrier being elastically deformable for the transfer from the freewheeling state into the braking state.

21 Claims, 1 Drawing Sheet

(51) Int. Cl.
*B60T 17/08* (2006.01)
*F16D 65/14* (2006.01)

(58) Field of Classification Search
USPC .................................. 188/78, 323, 333, 343
See application file for complete search history.

(56) References Cited

U.S. PATENT DOCUMENTS

| | | | |
|---|---|---|---|
| 1,848,775 A | 3/1932 | Girling | |
| 2,041,536 A | 5/1936 | Fromaget | |
| 3,368,648 A | 2/1968 | Brownyer | |
| 3,412,835 A | 11/1968 | Goldberg | |
| 9,702,422 B2* | 7/2017 | Wallmeier | F16D 65/08 |
| 9,869,358 B2* | 1/2018 | Wallmeier | F16D 65/08 |
| 2002/0023808 A1* | 2/2002 | Krumm, Sr. | F16D 65/08 188/74 |
| 2002/0162711 A1 | 11/2002 | Baumann et al. | |
| 2014/0202804 A1* | 7/2014 | Wallmeier | F16D 65/08 188/250 F |
| 2014/0202806 A1* | 7/2014 | Wallmeier | F16D 51/16 188/261 |

FOREIGN PATENT DOCUMENTS

| | | |
|---|---|---|
| DE | 69033567 | 3/2001 |
| DE | 102005056221 | 7/2006 |
| DE | 102006009008 | 8/2007 |
| DE | 102013201111 | 7/2014 |
| FR | 610902 | 9/1926 |
| FR | 649953 | 12/1928 |
| FR | 686613 | 7/1930 |
| FR | 737596 A | 12/1932 |
| FR | 822402 | 12/1937 |
| GB | 457420 | 11/1936 |
| JP | 2007107666 | 4/2007 |

* cited by examiner

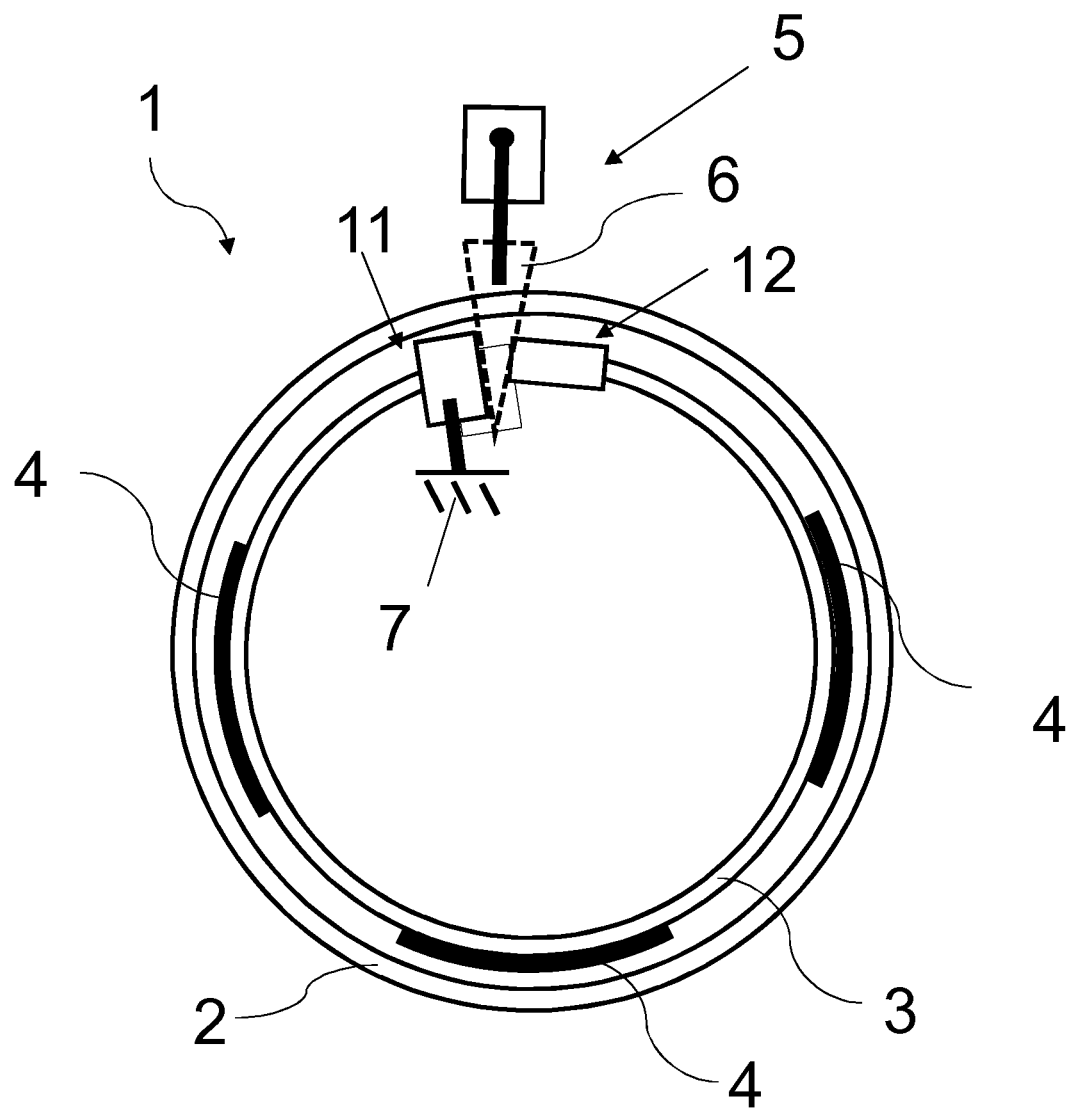

BRAKE DEVICE AND METHOD FOR OPERATING A BRAKE DRUM

BACKGROUND OF THE INVENTION

The present invention relates to a brake device, in particular a brake drum, and to a method for operating a brake device.

Brake devices, in particular drum brakes, are well known, for example from DE 10 2009 027 081 A. Here, the drum brakes are as a rule provided for commercial vehicles, in the case of which the wheels are mounted rotationally on rigid axles via bearings, in particular tapered roller bearings. In order to brake the wheels, a rotational movement of a brake drum which is connected fixedly to the respective wheel so as to rotate with it is inhibited. For this purpose, two brake shoes are typically arranged within the brake drum, which brake shoes are pivoted between a braking state, in which brake pads on the brake shoes come into an operative connection with an inner side of the drum brake, and a freewheeling state, in which the operative connection is canceled. The realization of a drum brake of this type is associated with a multiplicity of individual components, however.

It is therefore an object of the present invention to provide a brake device which requires fewer individual components in comparison with those from the prior art and is of correspondingly more compact configuration, without a braking action which emanates from the brake device being impaired disadvantageously.

SUMMARY OF THE INVENTION

According to the invention, a brake device for braking a wheel, in particular a drum brake, is provided, having a brake drum, a brake pad carrier which is arranged or can be arranged in the brake drum and has at least one brake pad, and an actuator device for the reversible transfer of the brake pad carrier between a braking state, in which the brake pad is operatively connected to the brake drum, and a freewheeling state, in which the operative connection between the brake pad and the brake drum is canceled, the brake pad carrier being elastically deformable for the transfer from the freewheeling state into the braking state. In comparison with the prior art, the brake pad carrier is advantageously configured and arranged in such a way that the brake pad carrier is deformed elastically from the braking state into the freewheeling state. That is to say, a stress state profile along the brake pad carrier changes during the transfer of the brake pad carrier from the freewheeling state into the braking state. As a consequence of the elastic deformation during the transfer, an articulation of the brake pad carriers on the brake carrier for pivoting which is associated with a multiplicity of individual parts can be dispensed with in an advantageous way. In particular, it is provided here that the brake carrier is elastically deformable in such a way that the elastically deformed brake pad carrier comes into contact by way of its brake pad with an inner side of the brake drum in the braking state. The brake pad which is pressed against the inner side of the brake drum via the brake pad carrier then forms a frictional resistance which leads to the braking of the brake drum, as a result of which ultimately the wheel which is connected fixedly to the brake pad carrier so as to rotate with it can be braked. Here, the brake pad is welded or riveted to the brake pad carrier, for example. Furthermore, in particular in the deformed state, the elastically deformed brake pad carrier is to be attributed a restoring force which returns the brake pad carrier back into the freewheeling state if no additional forces act on the brake pad carrier. In other words, the brake pad carrier is expediently prestressed in the braking state. Accordingly, an additional mechanism which returns the brake pad carrier from the braking state into the freewheeling state is not required, but rather it is sufficient to cancel the force which brings about the elastic deformation. Furthermore, it is advantageously provided that the brake pad carrier has a fixed point which remains stationary with respect to the brake carrier during the movement of the brake pad carrier, while the rest of the brake pad carrier is deformed. It is also conceivable that the brake pad carrier is not to be attributed any restoring forces in the freewheeling state. As an alternative, it is also conceivable that the brake pad carrier is to be attributed lower restoring forces in the freewheeling state than in the braking state, that is to say the brake pad carrier does not return even in the freewheeling state into a state, in which no restoring forces are to be attributed to it. The brake device is preferably a brake device which is such as is provided for a commercial vehicle, the brake drum being connected fixedly to the wheel so as to rotate with it. Here, the brake device is arranged on a rigid (that is to say, non-rotating) axis on its end side.

The brake pad carrier is fundamentally of elastically deformable configuration such that an independent, in particular spring-free, return of the brake pad carrier into the freewheeling state can be realized. In other words: no additional spring elements which are arranged in a region which is enclosed by the brake pad carrier are required to return the brake pad carrier into the freewheeling state.

The brake device preferably has a single brake pad carrier. Instead of the configuration with two brake shoes, the number of individual components can be reduced further by way of the single brake pad carrier. In addition, only a single actuator device and, in particular, only a single adjusting device are required, by way of which adjusting device brake pad wear is compensated for. Here, in particular, problems disappear which result during adjusting in the case of the use of two brake shoes on account of the asymmetrical loading which occurs during operation. In order to center the brake pad carrier in the freewheeling state, a spring element or a system comprising springs is preferably conceivable, by way of which the brake pad carrier is centered in the freewheeling state, in order to avoid inertia forces which act on the brake pad carrier during driving operation leading to unintended contact between the brake pad and the brake drum.

It is provided in accordance with a further embodiment of the present invention that the brake pad carrier extends, as viewed in the circulating direction, by more than 180°, preferably by more than 240°, and particularly preferably by more than 330°. As a result, a brake pad carrier which is as large as possible is advantageously provided, as a result of which the physical energy which is required for the deformation can be reduced and as large an area as possible is provided for one or more brake pads which can be arranged on the brake pad carrier.

In particular, the brake pad carrier is configured as an open ring. Here, the brake pad carrier is preferably arranged concentrically with respect to the brake drum in the freewheeling state.

It is provided in a further embodiment of the present invention that the brake pad carrier extends, as viewed in the circulating direction, by more than 180°, preferably by more than 240°, and particularly preferably by more than 330°, and has a brake pad on a side of the brake pad carrier, which side lies opposite the actuator apparatus. The brake pad carrier is preferably configured as an open ring, a brake pad being arranged on the brake pad carrier on a side which lies opposite the open region of the open ring. It is conceivable here that the brake pad which lies opposite the open region extends further, as viewed in the circulating direction, than the open region. It is provided, in particular, that a ratio between an extent (measured in the circulating direction) of the brake pad which lies opposite the open region to an extent (measured in the circulating direction) of the open region assumes a value of between 0.5 and 0.95, preferably of between 0.75 and 0.9 and particularly preferably of between 0.78 and 0.88.

A first end of the brake pad carrier is advantageously fixed in a stationary manner with respect to the brake carrier, and the actuator apparatus acts on a second end of the brake pad carrier. It is conceivable here, in particular, that the actuator apparatus is fixed or positioned in a stationary manner on the brake carrier together with the first end of the brake pad carrier. As a result of the fixing at the first end, a brake torque which adds up in the circumferential direction is advantageously supported on the brake carrier. Here, the first end represents a type of locating bearing. In particular, the actuator apparatus is configured in such a way that the force which acts on the brake pad carrier from the actuator device leads to a radial movement of the brake carrier. Here, a radial offset decreases from the second end to the first end, as viewed in the circulating direction, during the transfer between the freewheeling state and the braking state. For a controlled movement of the brake pad carrier, a guide is preferably provided at the second end, which guide prevents the force which emanates from the actuator device leading to an uncontrolled or undesired deformation. Furthermore, it is conceivable that the actuator apparatus is configured as a wedge mechanism or as a simplex cam mechanism. If the actuator apparatus is configured as a simplex cam mechanism, the simplex camshaft acts exclusively with the second end when the simplex camshaft is rotated.

It is provided, in particular, that the brake pad carrier is attached to the brake carrier in a joint-free and/or bearing-free manner. In other words: the brake pad carrier experiences exclusively a deformation and is not pivoted by means of a joint or a bearing. As a result, a joint or a bearing can advantageously be dispensed with at the interface between the brake pad carrier and the brake carrier.

Furthermore, it is preferably provided that the first end of the brake pad carrier and the second end of the brake pad carrier, via which a force which serves for spreading open is introduced during operation, are arranged so as to be flush with one another and/or so as to face one another as viewed in the circulating direction. As a result, the first end and the second end are advantageously arranged at the same level, with the result that the probability of an offset and resulting tilting of the first and the second end can be avoided.

It is expediently provided that the first end and/or the second end of the brake pad carrier have/has an end thickness (measured in the radial direction) which is greater than an intermediate thickness (measured in the radial direction) of the brake pad carrier between the first end and the second end. The ratio of the intermediate thickness to the end thickness preferably assumes a value of between 0.15 and 0.75, preferably of between 0.25 and 0.45, and particularly preferably of between 0.33 and 0.43. As a result (in particular, for a ratio of between 0.33 and 0.43), a geometry for the brake pad carrier is realized, in which the first end and/or second end widens/widens in such a way that a stable contact between the brake pad carrier and the actuator apparatus can be ensured, and secondly the weight of the brake pad carrier can be kept as low as possible and a deformability which is sufficient for the functionality of the brake device can be realized.

It is provided in a further embodiment of the present invention that the actuator apparatus has a wedge which can be brought into contact with the second end of the brake pad carrier and can be moved in the radial or axial direction for the reversible transfer of the brake pad carrier between the braking state and the freewheeling state. In particular, the brake pad carrier which is configured as an open ring can be spread open by means of the wedge and, as a result, can be transferred into the desired deformed state. It is provided here, in particular, that the wedge is supported at the stationary first end or bears against the latter during the transfer from the freewheeling state into the braking state. As a result, a probability for a non-flush orientation (as viewed in the circulating direction) of the first end and the second end can be reduced in an advantageous way, as a result of which tilting which would otherwise be possible in the brake device can be counteracted. Accordingly, the brake device can be stabilized by way of the combination of a stationary first end and the wedge. Furthermore, it is preferably provided that the actuator device is configured in such a way that it bears against the second end permanently, that is to say during the freewheeling state and the braking state, or only temporarily, that is to say exclusively during the braking state or for the transfer into the braking state. The axial or radial displacement or movement of the wedge is driven, for example, by way of a hydraulic or pneumatic system, in particular via a brake cylinder.

For the compensation of brake pad wear which occurs during operation of the brake device, in particular, the brake device has an adjusting mechanism in one advantageous embodiment, which adjusting mechanism is realized, for example, on the inlet side, that is to say between a brake cylinder and the wedge, or on the outlet side, that is to say in the region of the second end. As an alternative, it is also conceivable here that a bearing, for example a roller, is moved between the wedge and the second end for adjusting purposes, the bearing being positively guided and being arranged or oriented in a rest position in such a way that a predefined gap is set between the brake pad and the inner side of the brake drum. For this purpose, the contact faces which interact during the spreading open operation are configured in such a way that they run obliquely with respect to one another. It is advantageously possible by way of the adjusting to compensate for the wear on the brake pad which occurs during operation and thus to permanently ensure a substantially constant braking performance. In particular, the brake device comprises only a single adjusting mechanism. Despite the different loads as viewed in the circulating direction, this is advantageously possible if only a single brake pad carrier which is configured as an open ring is arranged within the brake drum.

The wedge is preferably arranged between the first end and the second end of the brake pad carrier. In this orientation, the wedge is arranged directly in its use area, with the result that substantially no unnecessary travel has to be spanned before the wedge initiates a transfer into the braking state. Moreover, the clear region which is provided by the open ring is utilized for the arrangement of the wedge in a manner which saves installation space.

It is provided in accordance with a further embodiment of the present invention that the brake pad carrier has a plurality of separate brake pads along its circumference. Here, in particular in the case of a brake pad carrier which is configured as an open ring, the plurality of brake pads can be designed in as optimum a manner as possible with respect to their layer thickness and extent. It is conceivable here that the brake pads become shorter or longer from the second end to the first end, as viewed in the circulating direction. Furthermore, it is conceivable that a layer thickness of the brake pad within a single brake pad and/or over a plurality of brake pads increases or decreases from the second end to the first end of the brake pad carrier, as viewed in the circulating direction. In particular, the increase/decrease is continuous and is dependent on an orientation of the brake pad carrier in the braking state. As a result, as great an active area as possible can be realized for the brake pads with the inner side of the brake drum. It is taken into consideration here, in particular, that an elastic deformation in the region of the second end is greater than an elastic deformation in the first region, and a radial offset of the brake pad carrier changes correspondingly from the second end to the first end, as viewed in the circulating direction. It is also conceivable that the brake pad carriers are arranged in an irregular manner with respect to one another along the circulating direction.

It is provided in one preferred embodiment that a first brake pad with a first layer thickness and a second brake pad with a second layer thickness are arranged behind one another as viewed in the circulating direction from the second end to the first end, the first layer thickness preferably being in a ratio of from 1.05 to 4, particularly preferably of from 1.2 to 2 and, in particular, preferably of from approximately 1.4 to 1.8 to the second layer thickness. This is advantageous, since the first brake pad expectedly enters into a braking action more frequently than the second brake pad. In this way, the wear of the first brake pad relative to the second brake pad can in turn be adapted in such a way that the two brake pads experience their maximum wear approximately at the same time. Here, the ratio of the abrasion resistance is preferably adapted in a manner which is dependent on the use profile to be expected of the brake device during use in the motor vehicle.

The second brake pad is preferably configured from a material with a higher coefficient of friction than the first brake pad. Since the second brake pad is preferably used in the case of full braking operations, it is advantageous that the brake shoe generates a maximum braking force in the case of said braking operations. For this reason, the second brake pad is advantageously configured from a material with a higher coefficient of friction than the first brake pad. The wear of a material with a higher coefficient of friction is usually greater than the wear of a material with a lower coefficient of friction, it being preferred for this reason to configure the first brake pad with a material of a lower coefficient of friction, and therefore also low wear, than the second brake pad.

The coefficient of friction of the second brake pad is with preference from 1.1 to 3 times, preferably from 1.15 to 2 times and particularly preferably from 1.3 to 1.7 times the coefficient of friction of the first brake pad. Depending on the use profile which is expected for the brake device during operation in the commercial vehicle, it can be preferred to configure the second brake pad from a material with a considerably higher or else a merely slightly higher coefficient of friction. Thus, for example, the material of the second brake pad can have a coefficient of friction which is three times that of the material of the first brake pad, in order to achieve a considerably increased overall coefficient of friction or mean coefficient of friction of the entire brake device in the case of an full braking operation. Secondly, it can also be preferred that the second brake pad is configured from a material of a merely slightly higher coefficient of friction than the first brake pad if, for example, relatively frequent full braking operations relative to the partial braking operations are to be expected.

Furthermore, the brake pads are expediently arranged irregularly along the circumference of the brake pad carrier.

It is advantageously provided that a proportion of regions (measured in the circulating direction) with a brake pad to an overall length (measured in the circulating direction) of the brake pad carrier lies between 20% and 90%, preferably between 40% and 80%, and particularly preferably between 60% and 70%.

The object is likewise achieved by way of a method for braking a wheel by way of a brake device in accordance with the preceding embodiments. All the features which are described for the brake device according to the invention and their advantages can likewise be transferred analogously to the method according to the invention, and vice versa.

Here, it is provided according to the invention that the brake pad carrier is deformed elastically for the transfer of the brake carrier from the freewheeling state into the braking state. Here, the transfer is brought about, in particular, by way of an actuating device. Furthermore, it is provided that the brake pad carrier is returned from the braking state into the freewheeling state by means of a restoring force which is to be attributed to the prestressed brake pad carrier in the braking state. To this end, for example for the transfer of the brake pad carrier from the braking state into the freewheeling state, a force which acts on the brake pad carrier in the braking state is interrupted or canceled, with the result that the restoring force which is to be attributed to the brake pad carrier in the braking state automatically returns the brake pad carrier into the freewheeling state.

BRIEF DESCRIPTION OF THE DRAWINGS

Further advantages and features result from the following description of preferred embodiments of the subject matter according to the invention with reference to the appended FIGURE. Individual features of the individual embodiment can be combined with one another here within the context of the invention.

In the FIGURE:

FIG. 1 shows a brake device in accordance with one preferred embodiment of the present invention.

DETAILED DESCRIPTION OF THE PREFERRED EMBODIMENTS

FIG. 1 shows a brake device 1, in particular a drum brake, in accordance with one preferred embodiment of the present invention. A brake device 1 of this type is provided, in particular, for commercial vehicles and serves to brake a wheel of the commercial vehicle. Here, the brake device 1 is preferably provided for rigid axles, that is to say for axles of the type which are arranged rigidly or in a non-rotatable manner on the vehicle body and/or on the chassis. Here, the rotation of the wheel is brought about by way of a bearing, in particular a tapered roller bearing, which is arranged at the end of the rigid axle. Furthermore, that part of the bearing which rotates with respect to the rigid axle is connected via a hub to a brake drum 2. In order to counteract a rotational movement of the brake drum 2 and therefore of the wheel, a brake pad carrier 3 with brake pads 4 is arranged within the brake drum 2. Here, the brake pads 4 are arranged on a side of the brake pad carrier 3, which side faces the brake drum 2. In the exemplary embodiment which is shown, the brake pad carrier 3 extends by more than 330° in the circulating direction, and three brake pads 4 which are separate from one another are arranged along the circulating direction. It is provided here in a braking state that the brake pads 4 come into an operative connection with an inner side of the brake drum 2. In particular, the brake pads 4 come into contact with the inner side of the brake drum 2 during the braking state in such a way that the brake pads 4 which bear against the inner side of the brake drum 2 interact in a non-positive manner with the inner side of the brake drum 2 as viewed in the circulating direction. In particular, the brake pad 4 forms a frictional resistance which causes the braking of the brake drum 2 and therefore of the wheel. In order to allow the wheel to rotate again, the operative connection between the brake drum 2 and the brake pad 4 is canceled again in a freewheeling state. It is provided, in particular, that the brake pad carrier 3 is configured and arranged in such a way that it is elastically deformable for the transfer from the freewheeling state into the braking state. It is provided in the exemplary embodiment which is shown in FIG. 1 that the brake pad carrier 3 runs concentrically with respect to the inner side of the brake pad 2 in the freewheeling state. The brake pad carrier 3 which is configured as an open ring is spread open for the transfer into the braking state, with the result that the brake pad carrier 3 leaves its concentric orientation and is moved toward the inner side of the brake drum 2 until the brake pads 4 come into an operative connection with the inner side of the brake drum 2. Here, a first end 11 of the brake pad carrier 3 is fixed in a stationary manner, preferably on a brake carrier 7, with the result that the second end 12 of the brake pad carrier 3 has to be moved for spreading open purposes, in particular along a direction which runs tangentially with respect to the circulating direction. It is conceivable here that the brake pad carrier 3 is guided in the region of the second end 12, in order that the second end 12 carries out a controlled movement during the transfer of the brake pad carrier 3 from the freewheeling state into the braking state.

In order to bring about the transfer from the freewheeling state into the braking state, an actuator device 5 is provided. In particular, the actuator device 5 comprises a wedge 6 which is brought into contact with a second end 12 of the brake pad carrier 3 for the transfer of the brake pad carrier 3 from the freewheeling state into the braking state. It is provided in the embodiment which is shown that the wedge 6 is moved radially for the transfer between the braking state and the freewheeling state. As a result of the movement of the wedge 6 between the first end 11 and the second end 12 of the brake pad carrier 3, the sides of the wedge 6 press the first end 11 and the second end 12 apart from one another, whereupon the brake pad carrier 3 is deformed elastically. As an alternative to a radial movement of the wedge 6 between the first end 11 and the second end 12, it is also conceivable that the wedge 6 is moved in the axial direction for the transfer from the freewheeling state into the braking state. In order to return the brake device 1 into the freewheeling state again, the wedge 6 is pulled out of the region between the first end 11 and the second end 12 again, with the result that an intrinsic restoring force which is to be attributed to the brake pad carrier 3 in the braking state returns the brake pad carrier 3 into its starting position again, in which starting position the brake pad carrier 3 is arranged substantially concentrically with respect to the inner side of the brake drum 2.

LIST OF DESIGNATIONS

1 Brake device
2 Brake drum
3 Brake pad carrier
4 Brake pad
5 Actuator device
6 Wedge
7 Brake carrier
11 First end
12 Second end

The invention claimed is:

1. A brake device for braking a wheel, comprising:
a brake drum;
a brake pad carrier arranged in the brake drum and including at least one brake pad; and
an actuator apparatus configured for reversible transfer of the brake pad carrier between a braking state in which the brake pad is operatively connected to the brake drum, and a freewheeling state in which the operative connection between the brake pad and the brake drum is canceled;
the brake pad carrier being elastically deformable for the transfer from the freewheeling state into the braking state;
a first end of the brake pad carrier being fixed in a stationary manner with respect to a brake carrier, and the actuator apparatus acting on a second end of the brake pad carrier, and the brake device having an adjusting mechanism configured on the inlet side or on the outlet side, the brake device configured such that the brake pad carrier is exclusively deformed in a pivot-free manner.

2. The brake device as claimed in claim 1, the brake device having a single brake pad carrier.

3. The brake device as claimed in claim 1, the brake pad carrier extending by more than 180° as viewed in a circulating direction.

4. The brake device of claim 3, the brake pad carrier extending by more than 240° as viewed in the circulating direction.

5. The brake device of claim 4, the brake pad carrier extending by more than 330° as viewed in the circulating direction.

6. The brake device as claimed in claim 1, the brake pad carrier being configured as an open ring.

7. The brake device as claimed in claim 1, the actuator apparatus having a wedge configured to be brought into contact with the second end of the brake pad carrier when moved along the linear path for the reversible transfer of the brake pad carrier between the braking state and the freewheeling state, wherein the linear path extends in a radial or an axial direction.

8. The brake device as claimed in claim 1, the brake device having a single adjusting mechanism.

9. The brake device as claimed in claim 7, the wedge being arranged between the first end and the second end of the brake pad carrier.

10. The brake device as claimed in claim 1, the brake pad carrier having a plurality of separate brake pads along a circumference of the brake pad carrier.

11. The brake device as claimed in claim 1, a layer thickness of the at least one brake pad increasing or decreasing from the second end to the first end of the brake pad carrier, as viewed in a circulating direction within one or more brake pad of the at least one brake pad.

12. The brake device as claimed in claim 1, a first brake pad of the at least one brake pad with a first layer thickness and a second brake pad of the at least one brake pad with a second layer thickness being arranged behind one another as viewed in a circulating direction from the second end to the first end, the first layer thickness preferably being in a ratio of from 1.05 to 4 to the second layer thickness.

13. The brake device as claimed in claim 12, wherein the ratio of the first layer thickness to the second layer thickness is from 1.2 to 2.

14. The brake device as claimed in claim 13, wherein the ratio of the first layer thickness to the second layer thickness is from 1.4 to 1.8.

15. The brake device as claimed in claim 12, the first brake pad comprising a material of higher abrasion resistance than the second brake pad.

16. The brake device as claimed in claim 12, a coefficient of friction of the second brake pad being from 1.1 to 3 times the coefficient of friction of the first brake pad.

17. The brake device as claimed in claim 16, wherein the coefficient of friction of the second brake pad is 1.15 to 2 times the coefficient of friction of the first brake pad.

18. The brake device as claimed in claim 17, wherein the coefficient of friction of the second brake pad is 1.3 to 1.7 times the coefficient of friction of the first brake pad.

19. The brake device as claimed in claim 1, wherein the at least one brake pad is arranged irregularly along a circumference of the brake pad carrier.

20. A method for braking a wheel by way of a brake device as claimed claim 1, the brake pad carrier being deformed elastically for the reversible transfer of the brake carrier from the freewheeling state into the braking state.

21. A brake device for braking a wheel, comprising:
a brake drum;
a brake pad carrier arranged in the brake drum and including at least one brake pad; and
an actuator apparatus configured for reversible transfer of the brake pad carrier between a braking state in which the brake pad is operatively connected to the brake drum, and a freewheeling state in which the operative connection between the brake pad and the brake drum is canceled;
the brake pad carrier being elastically deformable for the transfer from the freewheeling state into the braking state;
a first end of the brake pad carrier being fixed in a stationary manner with respect to a brake carrier, and the actuator apparatus acting on a second end of the brake pad carrier, and the brake device having an adjusting mechanism configured on the inlet side or on the outlet side, the brake device configured such that the brake pad carrier is exclusively deformed and is pivoted in a joint-free and/or bearing-free manner by movement of the actuator apparatus along a linear path.

* * * * *